UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,918.

Specification of Letters Patent.

Patented Jan. 7, 1908.

Application filed May 20, 1907. Serial No. 374,526.

*To all whom it may concern:*

Be it known that I, FLETCHER B. HOLMES, a citizen of the United States, residing at Woodbury, county of Gloucester, and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch a salt of pyrotartaric acid containing ammonium. The mixing may be made in any manner to produce a good mixture. They may be mixed wet or dry and in any kind of mixer. Preferably I mix the two in a finely divided powdered condition in a bowl provided with stirrers or paddles. Preferably I use an ammonium salt of pyrotartaric acid and of such salts I prefer to use neutral ammonium pyrotartrate

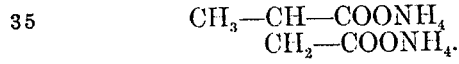

The salts of pyrotartaric acid containing ammonia which I can use include also double salts containing ammonia, such as sodium-ammonium-pyrotartrate

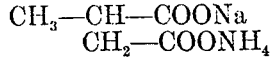

potassium ammonium pyrotartrate

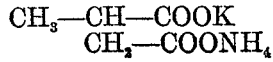

etc. Also I can use the acid ammonium pyrotartrate

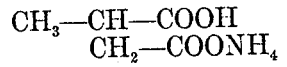

instead of the neutral ammonium pyrotartrate. The stabilizing reagent is mixed with the nitrated starch produced in the ordinary well known manner. The amount of the reagent used is, preferably, from two to five per cent., although I have used smaller and larger amounts with success. I have found three per cent. to give good results.

Having now fully described my invention, what I claim and desire to protect by Letters Patent is:

1. A stable explosive consisting of a mixture of nitrated starch and a salt of pyrotartaric acid containing ammonium, the latter being in such proportion as to stabilize the nitrated starch.

2. A stable explosive consisting of a mixture of nitrated starch and from two to five per cent. of a salt of pyrotartaric acid, containing ammonium.

3. A stable explosive, consisting of a mixture of nitrated starch and an ammonium salt of pyrotartaric acid, the latter being in such proportion as to stabilize the nitrated starch.

4. A stable explosive, consisting of a mixture of nitrated starch and from two to five per cent. of an ammonium salt of pyrotartaric acid.

5. A stable explosive, consisting of a mixture of nitrated starch and neutral ammonium pyrotartrate, the latter being in such proportion as to stabilize the nitrated starch.

6. A stable nitrated starch, consisting of a mixture of nitrated starch and from two to five per cent. of neutral ammonium pyrotartrate.

In testimony of which invention, I have hereunto set my hand, at Philadelphia, on this 15th day of May, 1907.

FLETCHER B. HOLMES.

Witnesses:
M. M. HAMILTON,
E. E. WALL.